Oct. 11, 1949.
P. J. PEDRO
2,484,460
STEAKMOLD
Filed March 14, 1946
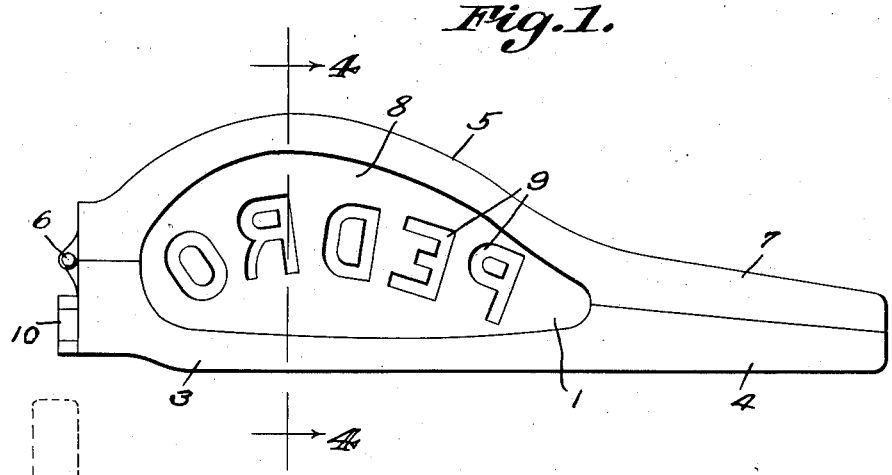
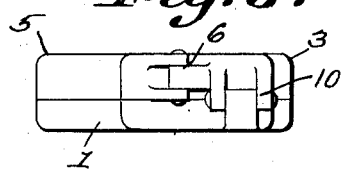
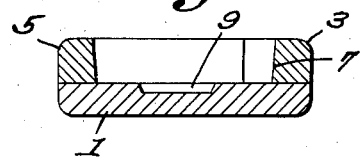
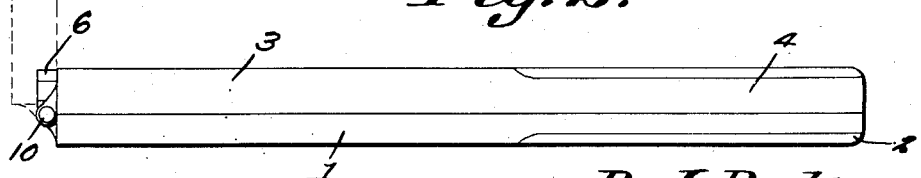
P. J. Pedro
INVENTOR.
BY *Abrowles.*
ATTORNEYS.

Patented Oct. 11, 1949

2,484,460

UNITED STATES PATENT OFFICE 2,484,460

STEAK MOLD

Philip J. Pedro, Shreveport, La.

Application March 14, 1946, Serial No. 654,343

2 Claims. (Cl. 17—32)

1

This invention relates to mold for holding ground meat so that it will resemble club steak which can be sold either by itself, or as the filling of a hamburger sandwich.

It is an object of the invention to provide a mold in which the meat can be packed before the cooking operation so that after the meat has been removed therefrom and cooked, it will not only have a distinctive appearance, but all of the prepared meat will be of the same size and shape, and can bear a distinctive mark.

Another object is to provide a mold formed of relativey movable parts which can be brought quickly into position to receive the meat to be molded and will be held in such position by the hand grasping the article, or by any supplemental means which may be used for that purpose.

A still further object is to provide a mold the several parts of which can be quickly moved apart so as to release the meat without changing its appearance.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing:

Figure 1 is a plan view of the article constituting the present invention.

Figure 2 is a front elevation thereof, the top members being shown by broken lines in raised position.

Figure 3 is an end elevation.

Figure 4 is a section on line 4—4, Fig. 1.

Referring to the figures by characters of reference, 1 designates a bottom plate which has an extension 2 forming a handle section at one end. To the other end of this plate is hingedly connected a top member 3 also formed with an extension 4 forming a handle section. A second top member 5 is positioned at one side of the member 3 and is joined thereto at one end by a hinge 6. This member 5 likewise has an extension 7 forming a handle section.

The members 3 and 5 and their extensions are adapted normally to rest flat upon the plate or bottom member 1 and when they are thus located the extensions 4, 7 and 2 will all be fitted snugly together, thereby cooperating to produce a handle.

2

The extensions 7 and 4 fit snugly against each other but a gap 8 of any desired configuration is formed between their extensions 3 and 5 and the hinged end portions of the members. This can be so shaped and of such depth as to receive a predetermined quantity of meat which will have a predetermined shape and size. Furthermore, a distinctive name can be molded in the top surface of the member 1 and exposed within the gap so that the meat, when delivered from the mold, will have the distinctive name displayed thereon. This distinctive name or mark has been indicated at 9 in Figs. 1 and 4 where it appears in the form of properly shaped depressions.

As before stated, the member 3 is joined to the member 1 by a hinge at one end. This hinge has been indicated at 10. When it is desired to use the mold the two members 4 and 7 are brought together as shown in Fig. 1 and are then swung downwardly on the hinge 10 until they rest snugly on the member 1. The recess indicated at 8 is then filled with meat, the same being packed tightly therein so as to not only fill this area but also to fill the depressions 9. The three extentions 2, 4, and 7 can then be used as a handle and as long as they are held together the several members of the mold will be prevented from moving apart.

After the meat has been molded, the plate 1 is lifted so as to withdraw it from contact with the meat and the members 3 and 5 are swung apart to release the side portions of the cooked meat. The molded meat is then removed from the mold and cooked, and it will be found that it will retain its size and shape and will also retain the marking appearing on the upper portion thereof.

By using a mold such as described all meats of one kind can be made so that each customer will receive a steak which is of the same size and shape and the same marking as those received by the other customers.

While this device is designed primarily for molding steak and other meat, it obviously can be employed also for other foods.

What is claimed is:

1. A mold for use in preparing food, including a bottom plate having a flat upper surface and an extension at one end, a top member hingedly connected to the other end of the plate for swinging in a plane perpendicular to the plane of the plate and adapted to rest on said upper surface, said top member having an extension, a second top member hingedly connected to the hinged end of the other top member for swinging in the plane of the first top member and having an extension, all of said extensions cooperating to form a handle when pressed together thereby to hold the plate and members in contact, said members having medial portions wholly spaced apart between their ends and cooperating with the bottom plate to form a food receiving recess open at its top.

2. A mold for use in preparing food, comprising a bottom member having a flat upper surface and having an extension, a side member hingedly connected at one end to one end of the bottom member and having an extension, a second side member hingedly connected to the first side member and having an extension, said side member supported upon the bottom member and having flat bottom surfaces in contact with side areas of the upper surface of the bottom member, all of the extensions cooperating to form a handle, and said side members having opposed spaced apart side surfaces cooperating with an exposed medial area of the upper surface of the bottom member to define the side wall and bottom, respectively, of a food-receiving recess open at its top.

PHILIP J. PEDRO.

REFERENCES CITED

The following references are of record in the file of this patent:

UNITED STATES PATENTS

| Number | Name | Date |
| --- | --- | --- |
| 142,524 | Spenzer | Sept. 2, 1873 |
| 746,971 | Marchiony | Dec. 15, 1903 |
| 1,031,221 | Wilson | July 2, 1912 |
| 1,544,778 | Schultz | July 7, 1925 |
| 1,989,724 | Villanyi | Feb. 5, 1935 |

FOREIGN PATENTS

| Number | Country | Date |
| --- | --- | --- |
| 19,999 | Great Britain | 1912 |